United States Patent
Rieck

(10) Patent No.: US 8,000,186 B2
(45) Date of Patent: Aug. 16, 2011

(54) ACTING TRACK-CROSSING DURING TRACKING ERROR ADJUST

(75) Inventor: Marcel Rieck, Wetzlar (DE)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 169 days.

(21) Appl. No.: 12/493,519

(22) Filed: Jun. 29, 2009

(65) Prior Publication Data

US 2009/0323483 A1    Dec. 31, 2009

(51) Int. Cl.
*G11B 7/00* (2006.01)
(52) U.S. Cl. .............. 369/44.32; 369/44.29; 369/44.28; 369/44.34; 369/44.36
(58) Field of Classification Search ............... 369/44.28, 369/44.32, 44.29, 44.34, 44.36
See application file for complete search history.

(56) References Cited

U.S. PATENT DOCUMENTS

| | | | | |
|---|---|---|---|---|
| 5,289,447 A * | 2/1994 | Kobayashi et al. | ........ | 369/44.28 |
| 5,532,990 A * | 7/1996 | Koyama et al. | ........... | 369/44.32 |
| 6,157,601 A * | 12/2000 | Kao et al. | ................... | 369/44.35 |
| 6,442,111 B1 * | 8/2002 | Takahashi et al. | ......... | 369/44.28 |
| 6,452,879 B1 * | 9/2002 | Tsukahara et al. | ......... | 369/44.36 |
| 2002/0196717 A1 * | 12/2002 | Masui et al. | ............... | 369/44.29 |

* cited by examiner

*Primary Examiner* — Wayne R Young
*Assistant Examiner* — Linh T Nguyen
(74) *Attorney, Agent, or Firm* — WPAT, PC; Justin King

(57) ABSTRACT

A method for enhancing the optical initializing operation comprises: sending a radial error signal from an optical pick-up unit to a radial error signal calibration unit; sending the radial error signal from the optical pick-up unit to an offset adjuster; sending a calibrated radial error signal from the radial error signal calibration unit to the offset adjuster and a gain adjuster; sending a radial actuator (RA) signal from the radial error signal calibration unit to activate a radial actuator during an initialization or a period for calculating RE signal calibrating parameters.

14 Claims, 4 Drawing Sheets

ACTING TRACK-CROSSING DURING TRACKING ERROR ADJUST

BACKGROUND OF THE INVENTION

1. Field of the Invention

This invention generally relates to optimize an optical device's operation. More particularly, the present invention relates to obtain more reliable operation parameters during the initialization to better facilitate the optical device's operation. In particular, such operation parameters provide an enhanced calibration for correcting Radial Tracking Error during the optical device's normal operation.

2. Description of Related Art

Before starting obtaining data from any optical storage media, the optical drive will start initializing the analogue front-end of the chip (CD/DVD chip). This initialization obtains multiple operation parameters to perform and to calibrate focusing, radial tracking, turn table motor control, and data retrieval.

One of the calibrations performed is the adjustment of the Radial Tracking Error (RE), which amongst others is used to keep the reading spot on track during normal playback. The algorithm that performs the calibration measures an initial minimum value and an initial maximum value of the RE-signal during track crossings, and the algorithm further determines over a period of time an average minimum and an average maximum value. Based on these values, the amplitude and the offset of the RE-signal are calculated and calibrated.

As the algorithm for calculating RE adjustment requires tracks to be crossed, the Optical Pick-up Unit (OPU) must be in focus. Therefore, the focus controller is switched to ON, and the Turn Table Motor (TTM) is also turned on in order to rotate the optical storage/disc. During this initializing/averaging period, sufficient track crossings are necessary in order to obtain a reliable measurement; but this is not always the case. In a first scenario that when a disc has eccentricity, there would be track-crossing points where the reading spot has zero velocity relative to the tracks. Because of the zero velocity relative to the tracks, any averaged values at these points might not be reliable. In a second scenario that when a disc has no eccentricity, there may be only very few track crossings or even no track crossing per averaging period, which does not provide sufficient information and thus results in a very unreliable measurement of the average RE amplitude and offset. A poor RE-signal calibration results in a degraded playability performance.

Referring to FIG. 1 of the drawing, the left graph 1 of FIG. 1 shows a number of signals during start-up/initialization of a conventional optical drive. From top to bottom, the signals shown are the Focus Actuator (FA), the Radial Actuator (RA), the sum of four light receiving parts A, B, C and D detectors (HF), and the Radial Error (RE) signal. The part of the start-up sequence that is of interest in this invention is marked with "RE calibration". During the period of the RE calibration, the focus controller is turned on, the disc rotates and in the HF, and the RE signal the track crossings are visible. However, the radial controller is not active.

The right graph 2 of FIG. 1 shows an enlarged view of a small section at the beginning of the RE calibration period in the left graph 1 in FIG. 1. The right graph 2 shows the turning points of the disc eccentricity where the relative velocity between the reading spot and the disc becomes slower and to zero, and then the velocity accelerates again in the opposite direction.

When these turning points are long enough, they can influence the reliability of the RE calibration. Furthermore, if these turning points occur between two tracks, the acquisition circuitry will not be able to detect any pits. The absence of pits detection will be interpreted the HF loss, which will trigger a HF recovery and force the RE calibration to be re-started subsequently. This chain reaction causes a significant prolonging in the initializing process and delays the optical device's normal operation.

The reliability of the RE calibration also decreases on discs with a very low eccentricity or almost no eccentricity. In the case of low or no eccentricity, the RE calibration procedure might even fail completely due to insufficient number of track crossing during the calibration period. Even if the poor RE calibration does not fail the playability of the optical drive, the operation parameters obtained from the insufficient track crossings will not be the optimum or correct values, and the optical drive's performance will deteriorate as a result of it.

SUMMARY OF THE INVENTION

The current invention resolves the problem by actively moving the radial actuator during the RE calibration procedure, and thereby it forces the track crossings to occur even during the eccentricity turning points. Thus, the current invention increases the playability of the optical drive.

Accordingly, it is an object of this invention to provide methods and an apparatus for improving and optimizing an optical device's operation. More particularly, the present invention overcomes the aforementioned issue by obtaining a more reliable operation parameter during the initialization to better facilitate the optical device RE calibration during its normal operation. In particular, such operation parameter provides an enhanced calibration for correcting RE during the optical device's normal operation.

To achieve the above advantage and in accordance with the purpose of the invention, as embodied and broadly described herein, the current invention provides an optical device with enhanced operating performance with an enhanced reliability of the RE signal calibration, wherein the optical device improves the reliability of the RE signal calibration by providing sufficient track crossings during the initialization or any period for calculating RE signal calibrating parameters. A preferred optical device further provides a moving means to operate the radial tracking actuator during the initialization or any period for calculating RE signal calibrating parameters.

The current invention further provides a method to enhance an optical device's operation performance by providing an enhanced reliability of the RE signal calibration, wherein the method improves the reliability of the RE signal calibration by providing sufficient track crossings during the initialization or any period for calculating RE signal calibrating parameters. A preferred optical device further provides a moving means to operate the radial tracking actuator during the initialization or any period for calculating RE signal calibrating parameters.

In accordance with the objects of the invention, an optical system with enhanced initializing performance comprises: a radial error (RE) calibration unit for receiving RE signal from an optical pick-up unit (OPU); the RE calibration unit sends RE calibration signals to an offset adjuster and a gain adjuster; and the RE calibration unit further sends a Radial Actuator (RA) signal to the OPU to activate a Radial Actuator during an initialization or a period for calculating RE signal calibrating parameters.

In accordance with the objects of the invention, an apparatus with enhanced performance of an optical initializing operation comprising: radial error (RE) calibrating means for receiving a radial error signal, generating a radial error calibrating adjustment based on the received radial error signal, and generating a radial actuator signal; radial controlling means for receiving a reliable radial error adjustment; and optical pick-up means for receiving the radial actuator signal to activate a radial actuator, and generating the radial error signal during an initialization or a period for calculating RE signal calibrating parameters.

In accordance with the objects of the invention, a method for enhancing the optical initializing operation comprises: sending a radial error signal from an optical pick-up unit to a radial error signal calibration unit; sending the radial error signal from the optical pick-up unit to an offset adjuster; sending a calibrated radial error signal from the radial error signal calibration unit to the offset adjuster and a gain adjuster; sending a radial actuator (RA) signal from the radial error signal calibration unit to activate a radial actuator during an initialization or a period for calculating RE signal calibrating parameters.

DRAWINGS

The teachings of the current invention will be more clearly understood by reference to the following detailed description associated with the accompanying drawings, in which.

DESCRIPTION OF THE PREFERRED EMBODIMENT

Figure 1:
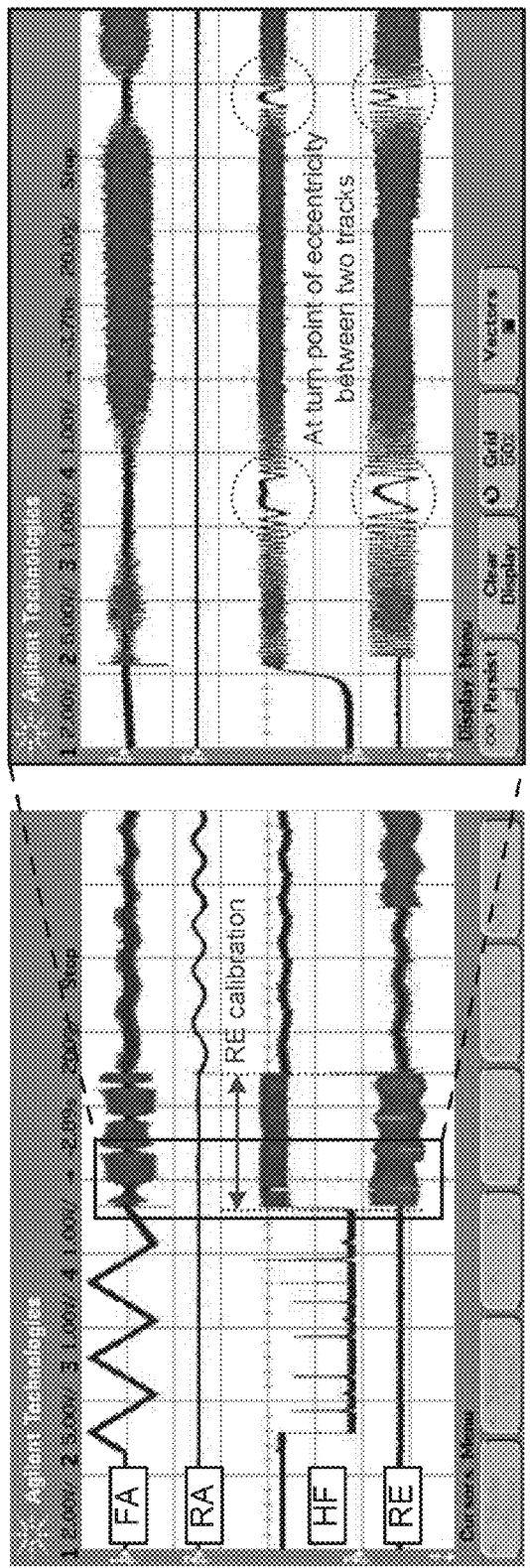
FIG. 1 depicts a snap shot of the signal analysis, using the tool developed by the Agilent Technologies, on the prior art during an optical drive's initialization.
Figure 2:
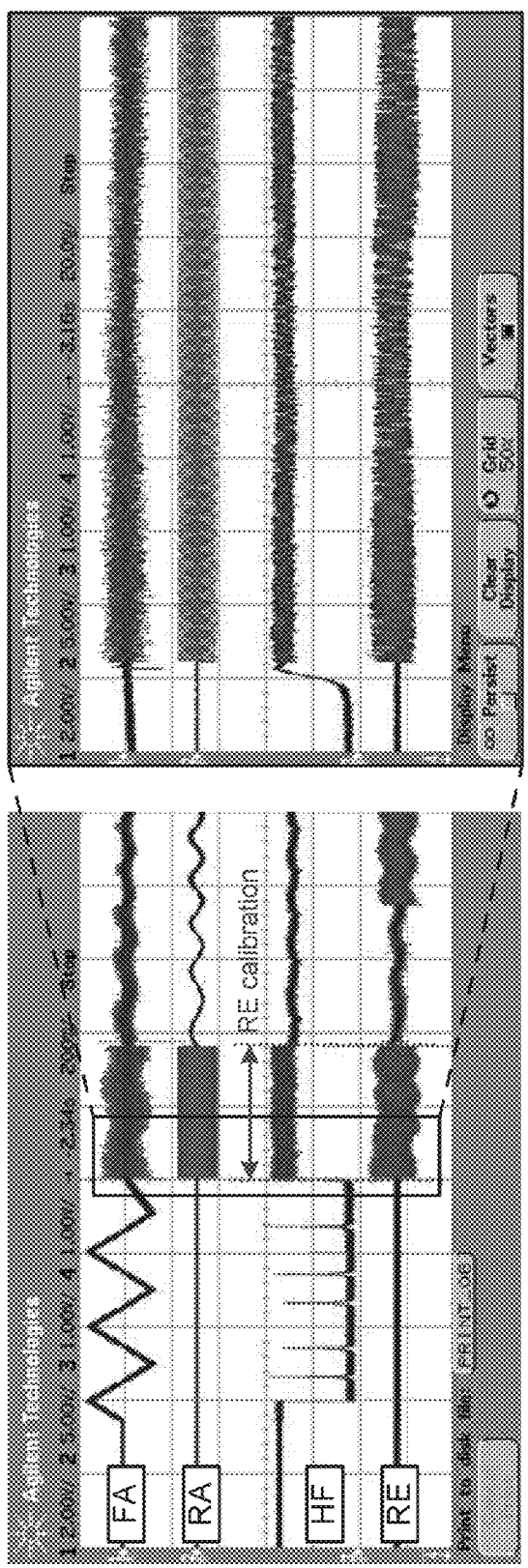
FIG. 2 depicts a snap shot of the signal analysis, using the tool developed by the Agilent Technologies, on the current invention during an optical drive's initialization.

Referring to FIG. 2 of the drawings, it illustrates the current invention's effect during the RE calibration period. During the calibration period, the radial actuator (RA) is actively driven by, for example, a 1300 Hz sine-wave shaped signal, and thereby it generates track crossings during the eccentricity turning points. The graph 4 on the right hand side of the FIG. 2 shows an enlarged view of a small section at the beginning of the RE calibration period in the graph 3 on the left hand side of the FIG. 2. As comparing to the graph 2 in FIG. 1, the turning points of eccentricity between two tracks have been eliminated. The system according to the current invention provides a smooth RE signal throughout the period.

Figure 3:
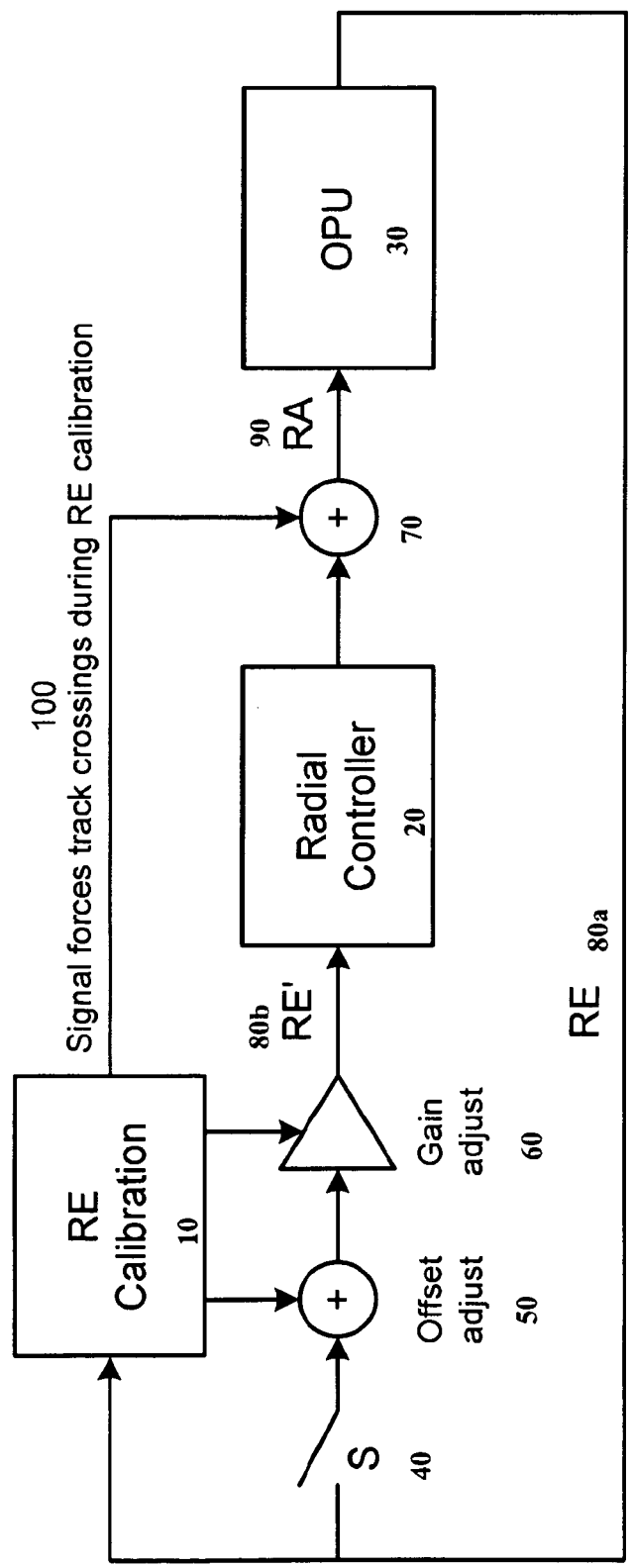
FIG. 3 depicts a schematic diagram of the current invention implemented the RE calibration during the optical device's initialization.

In most optical device (CD/DVD) chips, the current invention might easily be implemented by forcing the oscillator of the Automatic Gain Control (AGC) circuitry to inject its signal into the radial control loop during the RE calibration period. Referring to FIG. 3, the general implementation principle is shown. As a pre-condition the focus controller must be active, i.e. the reading spot is focused on the disc, and the disc must be rotating. The switch S 40 is open and the RE signal is sent to the RE calibration block 10. In an alternative embodiment, the switch S 40 can also be implemented to selectively forwarding the RE signal 80b to either the offset adjuster 50 or the RE calibration block 10. In another alternative embodiment, the system will continue calibrating the RE signal by opening the switch S 40 when the radial error exceeds a predetermined threshold.

The RE Calibration block 10, which implements the RE calibration procedure, generates a signal 100 that drives the radial actuator (RA) of the OPU 30 causing enough track crossings to be measured. After averaging the amplitude and offset of the original RE signal 80a over an acceptable period of time, the RE calibration block 10 adjusts the offset and the gain of RE in order to produce a reliable error signal 80b (RE') for the radial controller 20. An adder 70 receives both signal 100 from the RE calibration unit 10 and the RE calibrated result filtered by the radial controller 20. The adder 70 forwards the signal 100 to OPU 30 to activate the radial actuator of the OPU in order to improve the RE calibration result. The active track crossing signal 100 will be removed from the radial actuator of the OPU after the RE calibration period. This active track-cross practice during the radial error calibration procedure can be used in all types of optical drives (CD, DVD etcetera) that need to calibrate some kinds of radial tracking error signal.

Figure 4:
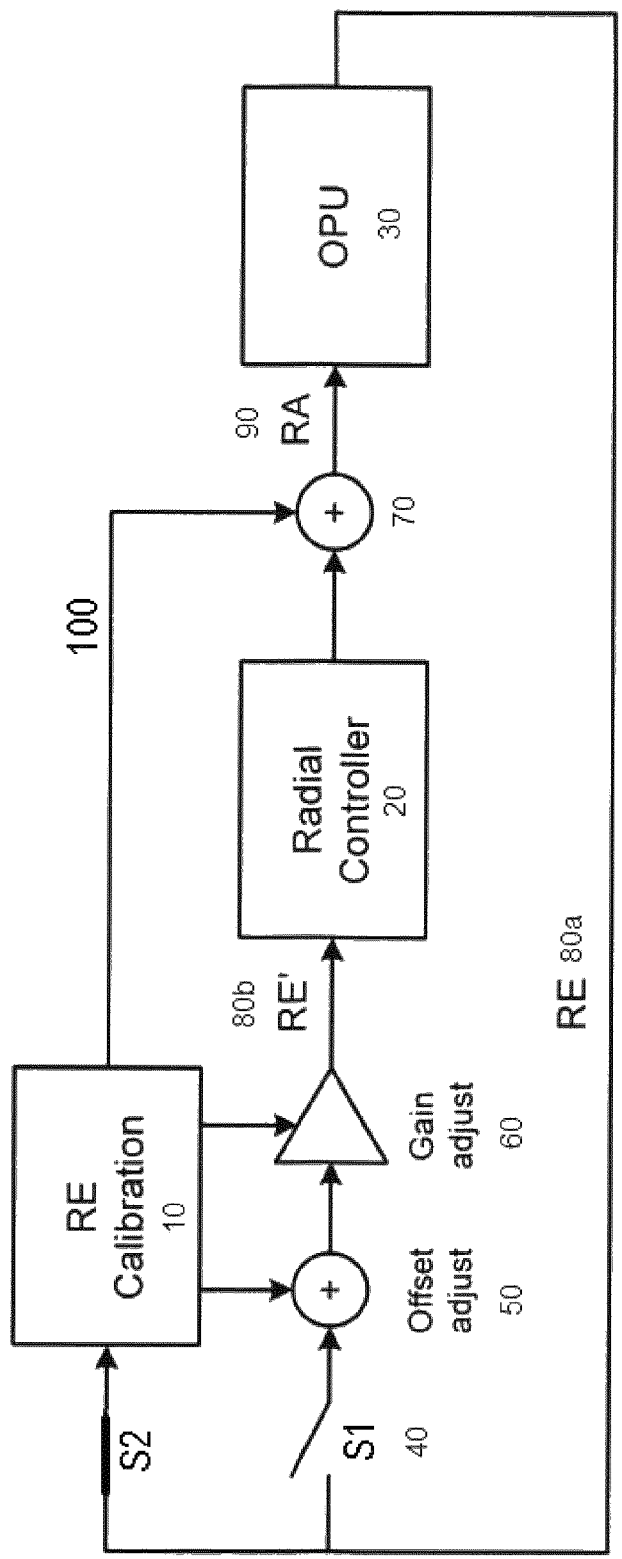
FIG. 4 depicts a schematic diagram of the second embodiment of current invention implemented the RE calibration during the optical device's initialization.

FIG. 4 shows a second embodiment of the present invention. In FIG. 4, switch S1 is open and switch S2 is closed. So that the RE signal 80a is sent to the RE calibration block 10. The RE calibration block 10 generates a signal 100 that drives the radial actuator (RA) of the OPU 30 causing enough track crossings to be measured. After averaging the amplitude and offset of the original RE signal 80a over an acceptable period of time, the RE calibration block 10 adjusts the offset and the gain of RE in order to produce a reliable error signal 80b (RE') for the radial controller 20. An adder 70 receives both signal 100 from the RE calibration unit 10 and the RE calibrated result from radial controller 20. The adder 70 forwards the signal 100 to OPU 30 to activate the radial actuator of the OPU according to the RE calibrated result. After radial calibration procedure, the offset and gain of the RE signal is determined, then the switch S2 is opened and switch S1 is closed. So that a reliable error signal 80b (RE') is generated by sending the RE signal 80a to the offset adjuster 50 and gain adjuster 60. The reliable error signal 80b is sent to the radial controller to control the RA. When needed, the switch S1 is opened and switch S2 is closed and the offset, gain can be adjusted by the RE calibration block 10.

Although preferred embodiments which incorporate the teachings of the current invention have been discussed and described, those skilled in the pertinent art can further modify or incorporate the teachings of the current invention into additional embodiments. It is obvious to those skilled in the pertinent art that many modifications of the present invention may be made without departing from what is intended to be limited solely by the appended claims.

What is claimed is:

1. An optical system with enhanced initializing performance comprises:
   an optical pick-up unit (OPU) generating an initial radial error signal;
   a radial error (RE) calibration unit receiving said initial radial error signal from said OPU, and generating a radial actuator (RA) signal;
   a radial controller receiving a reliable radial error signal and generating a radial error calibration result; and
   a radial actuator;
   an offset adjuster for
      receiving a RE calibration signal from said RE calibration unit and generating an offset adjusted signal; and
   a gain adjuster for receiving said RE calibration signal from said RE calibration unit;
receiving said offset adjusted signal from said offset adjuster;
generating said reliable radial error signal according to said RE calibration signal and said offset adjusted signal; and
sending said reliable radial error signal to said radial controller;
wherein said OPU activates said radial actuator to cause tracking crossing according to said RA signal and said radial error calibration result.

2. The optical system with enhanced initializing performance as claimed in claim 1, wherein said OPU activates said radial actuator to cause tracking crossing according to said RA signal and said radial error calibration result during a radial error initialization or for a predetermined period of time.

3. The optical system with enhanced initializing performance as claimed in claim 1, further comprising:
an adder for
receiving said radial error calibration result from said radial controller;
receiving said radial actuator signal from said RE calibration unit; and
determining whether to send said radial actuator signal to said OPU to activate said radial actuator to cause track crossing based on the radial error calibration result.

4. The optical system with enhanced initializing performance as claimed in claim 1, further comprising:
a switch for
receiving said initial radial error signal from said OPU; and
activating radial error calibration by forwarding said initial radial error signal, or deactivating radial error calibration, by terminating forwarding said initial radial error signal.

5. An optical system with enhanced initializing performance comprises:
an optical pick-up unit (OPU) generating an initial radial error signal;
a radial error (RE) calibration unit receiving said initial radial error signal from said OPU, and generating a radial actuator (RA) signal;
a radial controller receiving a reliable radial error signal and generating a radial error calibration result;
a radial actuator;
an offset adjuster for receiving a RE calibration signal from said RE calibration unit and generating an offset adjusted signal; and
a switch for
receiving said initial radial error signal from said OPU; and
activating radial error calibration by forwarding said initial radial error signal to said offset adjuster, or deactivating radial error calibration by terminating forwarding said initial radial error signal to said offset adjuster;
wherein said OPU activates said radial actuator to cause tracking crossing according to said RA signal and said radial error calibration result.

6. A method for enhancing initializing performance of an optical system comprises:
generating an initial radial error signal by an optical pick-up unit (OPU);
receiving said initial radial error signal by a radial error (RE) calibration unit;
generating a radial actuator (RA) signal by said RE calibration unit;
generating a RE calibration signal by said RE calibration unit;
receiving said RE calibration signal and generating an offset adjusted signal by an offset adjuster;
receiving said RE calibration signal, said offset adjusted signal by a gain adjuster and generating a reliable radial error signal by said gain adjuster according to said RE calibration signal and said offset adjusted signal;
receiving said reliable radial error signal by a radial controller, generating a radial error calibration result by said radial controller; and
activating a radial actuator to cause tracking crossing according to said RA signal and said radial error calibration result.

7. The method as claimed in claim 6, wherein activating said radial actuator to cause tracking crossing according to said RA signal and said radial error calibration result is performed during a radial error initialization or is for a predetermined period of time.

8. The method as claimed in claim 6, further comprising:
receiving said radial error calibration result by an adder from said radial controller;
receiving said radial actuator signal by said adder from said RE calibration unit; and
determining by said adder whether to send said radial actuator signal to said OPU to activate said radial actuator to cause track crossing based on the radial error calibration result.

9. The method as claimed in claim 6, further comprising:
receiving said initial radial error signal by a switch; and
activating radial error calibration by said switch via forwarding said initial radial error signal to said offset adjuster, or deactivating radial error calibration by said switch via terminating forwarding said initial radial error signal to said offset adjuster.

10. A method for enhancing initializing performance of an optical system comprises:
generating an initial radial error signal by an optical pick-up unit (OPU);
receiving said initial radial error signal by a radial error (RE) calibration unit;
generating a radial actuator (RA) signal by said RE calibration unit;
generating a RE calibration signal by said RE calibration unit;
receiving said RE calibration signal and generating an offset adjusted signal by an offset adjuster;
receiving a reliable radial error signal and generating a radial error calibration result by a radial controller,
activating a radial actuator to cause tracking crossing according to said RA signal and said radial error calibration result;
receiving said initial radial error signal by a switch; and
activating radial error calibration by said switch via forwarding said initial radial error signal to said offset adjuster, or deactivating radial error calibration by said switch via terminating forwarding said initial radial error signal to said offset adjuster.

11. An apparatus with enhanced performance of an optical initializing operation comprises:
radial error (RE) calibrating means for
receiving an initial radial error signal;

generating a radial calibration signal based on said initial radial error signal; and
generating a radial actuator (RA) signal;
radial controlling means for
   receiving a reliable radial error signal; and
   generating a radial error calibration result;
radial actuating means for
   generating tracking crossing;
optical pick-up means for
   generating said initial radial error signal; and
   activating said radial actuating means according to said RA signal and said radial error calibration result,
offset adjustinq means for
   receiving a RE calibration signal from said RE calibrating means; and generating an offset adjusted signal; and
gain adjusting means for
   receiving said RE calibration signal from said RE calibrating means;
   receiving said offset adjusted signal from said offset adjusting means;
   generating said reliable radial error signal according to said RE calibration signal and said offset adjusted signal; and
   sending said reliable radial error signal to said radial controller.

12. The apparatus as claimed in claim 11, wherein said optical pick-up means activates said radial actuating means to generate tracking crossing according to said RA signal and said radial error calibration result during a radial error initialization or for a predetermined period of time.

13. The apparatus as claimed in claim 11, further comprising:
   multiplexing means for
      receiving said radial error calibration result from said radial controlling means;
      receiving said radial actuator signal from said RE calibrating means; and
      determining whether to forward said radial actuator signal to said optical pick-up means to activate said radial actuating means to cause track crossing based on the radial error calibration result.

14. The apparatus as claimed in claim 11, further comprising:
   switching means for
      activating radial error calibration by forwarding said initial radial error signal, or deactivating radial error calibration by terminating forwarding said initial radial error signal.

* * * * *